United States Patent
Clauss et al.

(10) Patent No.: US 10,808,942 B2
(45) Date of Patent: Oct. 20, 2020

(54) CARRYING OUT A CLEANING PROCEDURE FOR A COOKING DEVICE

(71) Applicant: BSH Hausgeräte GmbH, Munich (DE)

(72) Inventors: Stéphane Clauss, Stotzheim (FR);
Sebastien Flesch, Gerstheim (FR);
Nicolas Chabut, Gertwiller (FR);
Julien Adam, Strasbourg (FR)

(73) Assignee: BSH Hausgeräte GmbH, Munich (DE)

( * ) Notice: Subject to any disclaimer, the term of this patent is extended or adjusted under 35 U.S.C. 154(b) by 348 days.

(21) Appl. No.: 15/544,531

(22) PCT Filed: Mar. 1, 2016

(86) PCT No.: PCT/EP2016/054275
§ 371 (c)(1),
(2) Date: Jul. 19, 2017

(87) PCT Pub. No.: WO2016/155963
PCT Pub. Date: Oct. 6, 2016

(65) Prior Publication Data
US 2017/0363298 A1     Dec. 21, 2017

(30) Foreign Application Priority Data
Mar. 30, 2015   (EP) .................................... 15290088

(51) Int. Cl.
*F24C 14/00*    (2006.01)
*A21B 3/04*    (2006.01)
(Continued)

(52) U.S. Cl.
CPC .............. *F24C 14/005* (2013.01); *A21B 3/04* (2013.01); *F24C 15/325* (2013.01);
(Continued)

(58) Field of Classification Search
None
See application file for complete search history.

(56) References Cited

U.S. PATENT DOCUMENTS

| | | | |
|---|---|---|---|
| 7,537,004 B2 * | 5/2009 | Reay | F24C 15/327 126/20 |
| 9,599,347 B2 * | 3/2017 | Furlanetto | F24C 14/005 |

(Continued)

FOREIGN PATENT DOCUMENTS

| | | | |
|---|---|---|---|
| DE | 102008063100 A1 | 7/2010 | |
| DE | 102013021732 A1 * | 7/2015 | .......... F24C 14/0005 |

(Continued)

OTHER PUBLICATIONS

English Translation of DE102013021732, accessed on Oct. 2019. (Year: 2015).*

(Continued)

*Primary Examiner* — Eric W Golightly
*Assistant Examiner* — Arlyn I Rivera-Cordero
(74) *Attorney, Agent, or Firm* — Michael E. Tschupp; Andre Pallapies; Brandon G. Braun

(57) ABSTRACT

In a method for carrying out a cleaning procedure for a cooking appliance, a first tank of the cooking appliance is filled by a user with water. A first portion of water in the first tank is moved into a buffer store and then moved from the buffer store into a cooking chamber to provide a first treatment agent therein. The first treatment agent remains in the cooking chamber for a first time period. A second portion of water in the first tank is moved into the buffer store and the first treatment agent is moved into the first tank. The second portion of water in the buffer store is into the cooking chamber to provide a second treatment agent in the cooking chamber. The second treatment agent remains in the cooking
(Continued)

chamber for a second time period and the second treatment agent is then moved into the first tank.

10 Claims, 14 Drawing Sheets

(51) Int. Cl.
    *F24C 15/32*     (2006.01)
    *B05B 7/32*     (2006.01)
    *B08B 9/34*     (2006.01)

(52) U.S. Cl.
    CPC .............. *F24C 15/327* (2013.01); *B05B 7/32* (2013.01); *B08B 9/34* (2013.01)

(56) References Cited

U.S. PATENT DOCUMENTS

| | | |
|---|---|---|
| 2001/0011549 A1 | 8/2001 | Durth et al. |
| 2006/0249136 A1 | 11/2006 | Reay et al. |
| 2008/0078371 A1* | 4/2008 | Boscaino ................ A21B 3/04 126/20 |

FOREIGN PATENT DOCUMENTS

| | | |
|---|---|---|
| EP | 2273200 A1 | 1/2011 |
| WO | 2012022607 A1 | 2/2012 |

OTHER PUBLICATIONS

International Search Report PCT/EP2016/054275 dated Apr. 13, 2016, 2 pages.

* cited by examiner

CARRYING OUT A CLEANING PROCEDURE FOR A COOKING DEVICE

CROSS-REFERENCES TO RELATED APPLICATIONS

This application is the U.S. National Stage of International Application No. PCT/EP2016/054275, filed Mar. 1, 2016, which designated the United States and has been published as International Publication No. WO 2016/155963 A1 and which claims the priority of European Patent Application, Serial No. 15290088.2, filed Mar. 30, 2015, pursuant to 35 U.S.C. 119(a)-(d).

BACKGROUND OF THE INVENTION

The invention relates to a method for carrying out a cleaning procedure for a cooking appliance. The invention further relates to a cooking appliance, which is designed to carry out a cleaning procedure, the cooking appliance having a cooking chamber and a first tank that can be filled by a user. The invention can in particular be advantageously applied to cooking appliances without an external water connection, in particular steam cooking appliances. The invention can in particular be advantageously applied to domestic cooking appliances.

DE 10 2010 039 513 A1 discloses a steam cooking appliance apparatus with a steam generator, which features an evaporation unit, a residual water tank and a fresh water tank. It is proposed that the steam generator comprises at least one line, which carries a fluid from the residual water tank to the evaporation unit in at least one operating state.

EP 1 724 529 B1 discloses an oven comprising the following: a housing which defines a hollow cooking chamber; a steam generator with an inlet for receiving water, a discharge and a steam outlet, which is effectively connected to the hollow cooking chamber, to introduce steam into the hollow cooking chamber; and a portable vessel, which is attached in a removable manner to the oven and has an outlet and an inlet, which are coupled fluidic ally to the inlet and discharge respectively of the steam generator, when the portable vessel is attached to the oven, with the result that the portable vessel supplies water to the steam generator and receives discharged water from the steam generator, it comprising a water storage container which is coupled fluidically to the steam generator inlet and the vessel outlet, when the portable vessel is attached to the oven.

BRIEF SUMMARY OF THE INVENTION

It is the object of the present invention to eliminate at least some of the disadvantages of the prior art and in particular to provide a way of cleaning a cooking appliance that is not connected to an external water connection, which requires particularly little water and can be carried out at least largely automatically by the cooking appliance.

This object is achieved according to the features of the independent claims. Preferred embodiments will emerge in particular from the dependent claims.

The object is achieved by a method for carrying out a cleaning procedure for a cooking appliance with at least the following steps: (a) a user filling a tank (referred to in the following without restricting its general nature as the "first" tank) of the cooking appliance with water, (b) moving—e.g. draining or pumping out—a first portion of the water present in the first tank into a buffer store of the cooking appliance, (c) moving the water present in the buffer store into a cooking chamber of the cooking appliance to provide a first treatment agent in the cooking chamber, (d) leaving the first treatment agent in the cooking chamber for a first time period, (e) moving a second portion of the water present in the first tank into the buffer store, (f) moving the first treatment agent into the first tank, (g) moving the water present in the buffer store into a cooking chamber of the cooking appliance to provide a second treatment agent in the cooking chamber, (h) leaving the second treatment agent in the cooking chamber for a second time period and (i) moving the second treatment agent into the first tank.

This method has the advantage that the cooking chamber or its walls can be treated, for example can be cleaned, with relatively little water and only a small structural outlay. Such a method is also particularly user-friendly, as apart from step (a) the method is carried out automatically by the cooking appliance. In particular a user does not have to empty or refill the tanks between said steps. Also step (i) allows the two treatment agents to be mixed in the first tank, to produce a mixture that can be handled with particularly little risk. The two treatment agents can thus neutralize one another in the first tank or the second treatment agent can dilute the first treatment agent, etc. This method can also be applied to cooking appliances without a dedicated water connection.

In a particularly advantageous development for user-friendly handling the first tank can be removed from the cooking appliance. Alternatively or additionally it can be filled with liquid by means of a filling line.

Water can be moved out of the first tank for example by pumping the water out of the first tank into the buffer store.

Moving a portion of the water present in the first tank means that not all the water that can be removed from the first tank is moved into the buffer store, just a predetermined part of it.

The buffer store can be incorporated permanently in the cooking appliance.

In a further development that is advantageous for a simple structure a (nominal) filling volume of the buffer store is half the (nominal) filling volume of the first tank. However the buffer store can also be larger, which inter alia allows more than half the water present in the first tank to be moved into the buffer store, allowing different volumes of the two treatment agents. However the buffer store can in principle also be smaller, for example if steps (b) and (c) are performed at the same time. The filling volume of the buffer store is in particular a function of the quantity of water required for the second treatment agent.

The provision of a treatment agent in the cooking chamber can include the treatment agent being introduced into the cooking chamber already mixed for example. The treatment agent can be applied for example in a buffer store. The provision of a treatment agent in the cooking chamber can also include the treatment agent first being generated in the cooking chamber, for example by adding a treatment additive to water which is present in the cooking chamber (or vice versa).

The treatment agent can be a liquid and/or steam. The treatment agent can therefore be present as liquid and/or steam in the cooking chamber. The treatment agent can also be referred to as a "treatment fluid".

The treatment agent can be moved into the first tank for example in its liquid state by simply draining it or pumping it out.

Steps (b) and (c) can also be carried out at the same time, for example if water moved out of the first tank into the buffer store runs directly on into the cooking chamber.

In one embodiment the first treatment agent and the second treatment agent neutralize one another. This allows the liquid present in the first tank after step (i) to be handled, e.g. emptied out by a user, with particularly little risk.

In one development one treatment agent is an alkaline fluid and the other treatment agent is an acidic fluid. This development has the advantage that the two treatment agents can at least almost neutralize one another after step (i) in the first tank. An alkaline treatment agent can also be used particularly effectively to dissolve grease and an acidic treatment agent can be used particularly effectively to dissolve lime. The alkaline fluid can have a pH value of 11 or more for example. The acidic fluid can have a pH value of 2 or less for example.

In a further embodiment the second treatment agent is clear water. The water can wash away residues of the first treatment agent in the cooking chamber. The movement of the water into the first tank also allows the first treatment agent present there to be diluted to a non-hazardous level.

In yet another embodiment the first treatment agent is clear water, because the cooking chamber can then undergo a pre-rinse procedure, for example to remove and/or soften larger residues. The movement of the water into the first tank here also allows a second treatment agent introduced later to be diluted to a non-hazardous level.

In a further embodiment at least the following steps are also included: (j) a user filling a second tank of the cooking appliance with water, (k) moving a first portion of the water present in the second tank into the buffer store, (l) moving the water present in the buffer store into the cooking chamber to provide a third treatment agent in the cooking chamber, (m) leaving the third treatment agent in the cooking chamber for a third time period, (n) moving a second portion of the water present in the second tank into the buffer store, (o) moving the third treatment agent into the second tank, (p) moving the water present in the buffer store into the cooking chamber to provide a fourth treatment agent in the cooking chamber, (q) leaving the fourth treatment agent in the cooking chamber for a fourth time period and (r) moving the fourth treatment agent into the second tank. This has the advantage that the cooking chamber can be cleaned in a particularly varied manner and/or particularly thoroughly.

Steps (j) to (r) can be embodied in the same manner as steps (a) to (i). The second tank can also be embodied and/or used (for example removed, etc.) in the same manner as the first tank. The second tank can have a filling volume that is smaller or greater than the filling volume of the first tank or the filling volumes of the two tanks can be identical. The filling volume of the buffer store can then in particular be the same as or greater than half a (nominal) filling volume of the larger of the two tanks.

Generally steps (a) to (r) do not have to be carried out in the specified sequence. Steps (b) and (c) or steps (k) and (l) can also be carried out at the same time.

Steps (a) and (j) can also be carried out before the other steps, in any sequence or even at the same time.

In one development the third treatment agent is the same as the first treatment agent and the fourth treatment agent is the same as the second treatment agent. This allows the cooking chamber to be treated twice in the same manner.

In one development that is advantageous for particularly thorough cleaning the treatment agents in steps (a) to (i) on the one hand and steps (j) to (r) on the other hand are different from one another.

In one embodiment the fourth treatment agent is clear water. In another embodiment the third treatment agent is also clear water.

These embodiments have the advantage that steps (j) to (r) can serve to produce a particularly residue-free cooking chamber.

In one development the first treatment agent and the second treatment agent are cleaning agents, while the third treatment agent and the fourth treatment agent are water. This means that the cooking chamber can first be cleaned in steps (b) to (i) and then be rinsed, for example in an interim and/or final rinse, particularly thoroughly in steps (k) to (r). The first treatment agent and the second treatment agent preferably neutralize one another in the first tank.

In another development the first treatment agent and the third treatment agent are cleaning agents, while the second treatment agent and the fourth treatment agent are water. This means that the cooking chamber can be rinsed after each clean with a cleaning agent. The second treatment agent dilutes the first treatment agent in the first tank and the fourth treatment agent dilutes the third treatment agent in the second tank.

The cooking chamber can generally be treated by the various treatment agents one after the other.

Generally more than two cleaning agents can also be used one after the other.

In another embodiment at least one of the treatment agents present in the cooking chamber is heated. This can improve a treatment effect, in particular a cleaning effect. Heating can take place in the cooking chamber and/or before introduction into the cooking chamber. For example the cooking chamber can be heated in order to heat the treatment agent present therein. Alternatively or additionally the treatment agent can be heated before being introduced into the cooking chamber as a liquid and/or can be evaporated. The buffer store for example can be such that it can be heated and/or a liquid line can such that it can be heated, for example in the manner of a continuous flow heater. Heating can however also include heating without evaporation.

In another embodiment steam from at least one treatment agent is or can be applied to the cooking chamber. As the steam can easily reach all the parts of the cooking chamber, such treatment is particularly comprehensive. To generate steam the cooking chamber can be heated accordingly for example and/or the domestic cooking appliance can have at least one means for generating steam (for example an evaporator tray provided in the cooking chamber and/or a steam generator provided outside the cooking chamber).

In another embodiment at least one treatment agent is circulated, which further improves a treatment effect. Circulating means in particular that liquid is removed from the cooking chamber and the removed liquid is fed back into the cooking chamber at a different point. The liquid is removed from the cooking chamber in particular at the base. The domestic cooking appliance can have a pump for circulating purposes. This can be the same pump that is also used to empty the first tank and/or the second tank or it may be a different pump. Feeding back in advantageously takes place under pressure, in order to be able to spray walls of the cooking chamber effectively, e.g. by way of a nozzle.

In one development at least one treatment additive is released at the appliance in a dosed manner by means of at least one dosing apparatus, the treatment additive forming the associated treatment agent together with clear water from the buffer store. The treatment additive or active additive can be for example a liquid (e.g. present as a concentrate) or solid (e.g. in powder or granule form) additive, in particular an additive that dissolves in water. This development includes a user not having to add the treatment additives him/herself during a treatment procedure but this being performed or initiated by the appliance. In particular this means there is no need for supply ducts into the cooking chamber for the user to introduce the treatment additives one after the other. The dosing apparatus can be incorporated permanently in the cooking appliance. Alternatively it can be inserted and removed again by a user, for example only being inserted for a cleaning procedure. In this instance a holder for the dosing apparatus in particular is permanently present in the cooking appliance.

In a particularly user-friendly and easy to use development the at least one dosing apparatus is at least one cartridge that can be inserted through the cooking chamber. The cartridge can be a single-use or disposable cartridge. The cartridge can be for example a Gaggenau cleaning cartridge. The cartridge can have a number of chambers, in which respective treatment additives are held. The cartridge can be separated from the cooking chamber, for example by respective barrier walls made of wax and the like. Successive dispensing of the treatment additives into the cooking chamber can be controlled for example by the appliance in that the barrier walls have different melting temperatures and the domestic cooking appliance is designed to set a cooking chamber temperature for a time when a treatment additive is to be dispensed.

Alternatively or additionally at least one dosing apparatus that can be controlled electrically by the domestic cooking appliance can dispense at least one treatment agent into the cooking chamber or into a container located outside the cooking chamber, for example into the buffer store.

In a further embodiment at least one property of a content of at least one of the tanks is detected by means of at least one sensor. This allows a liquid present in the respective tank to be set to a predetermined target value or target range and/or at least one action to be triggered when a predetermined value or value range is reached, e.g. an optical and/or acoustic warning signal to be triggered or deactivated, a tank to be unlocked for removal, etc.

In one development a pH value is detected, for example by means of a pH sensor. It can thus be verified whether a content of the tank is sufficiently neutral to be able to be removed or drained safely.

In a further development a temperature value is detected, for example by means of a temperature sensor. It can thus be verified whether a content of the tank is sufficiently cold to be able to be removed or drained safely.

In another development at least one fill level is detected, for example by means of a fill level sensor (e.g. a float, by means of ultrasound, etc.). It can thus be verified whether a tank is likely to overflow.

In another embodiment the tanks can be locked to prevent removal and unlocked for removal. To this end the domestic cooking appliance can have for example a corresponding locking facility, which is connected for example to a control facility of the cooking appliance and can be activated by means of this. It is thus possible to prevent the tanks being removed during a treatment with a treatment agent when a liquid is too hot, when a liquid is not sufficiently neutral, etc. The optional locking and/or unlocking can be carried out subject to sensor control. The optional locking and/or unlocking can also be carried out subject to time or program control, for example as a function of reaching a defined program segment. The tanks can thus be locked before step (b) and unlocked after step (r).

The object is also achieved by a cooking appliance, in particular a domestic cooking appliance, which is designed to carry out the method described above. The cooking appliance can be configured in the same manner as the method and has the same advantages.

In one embodiment the cooking appliance is an oven, as ovens typically require a particularly high level of cleaning and ovens generally do not have a water connection. This allows a pyrolysis function of the cooking appliance for example to be dispensed with. In the case of an oven the cooking chamber can also be referred to as an oven chamber. The cooking appliance can also have a microwave functionality.

The cooking appliance can also have a steam cooking function, e.g. in addition to a standard oven, or can be a standalone steam cooker.

In one development a base of the cooking chamber can optionally be connected to the tank or tanks. This allows practically all the liquid to be removed from the cooking chamber. The connection (for example a liquid duct) can optionally be broken or opened at the appliance by means of a stop apparatus (for example to leave or drain a treatment agent into the tank or into one of the tanks). The stop apparatus can be or have for example a controllable valve.

In another embodiment the cooking appliance has a liquid circuit, in which liquid is circulated, the cooking chamber being part of the liquid circuit. Because this allows liquid to be conducted out of the cooking chamber (e.g. at the base) and introduced back into the cooking chamber at a different point, the cooking chamber can be treated particularly efficiently when a treatment agent in liquid form is used. In one development the circulating circuit does not have a tank as a component, in other words no tank is part of the circulating circuit.

For its automatic operation the cooking appliance advantageously has a control facility, for example to activate or deactivate heaters, pumps, valves, locking facilities, etc. The control facility can be designed to run at least one automatic program system, for example to run cooking programs and cleaning programs.

The cooking appliance in particular has no water connection to a water supply network and no water discharge.

BRIEF DESCRIPTION OF THE DRAWINGS

The properties, features and advantages of this invention as described above and the manner in which these are achieved will become clearer and more readily comprehensible in conjunction with the schematic description below of an exemplary embodiment, which is described in more detail in conjunction with the drawings, in which.

DETAILED DESCRIPTION OF EXEMPLARY EMBODIMENTS OF THE PRESENT INVENTION

Figure 1:
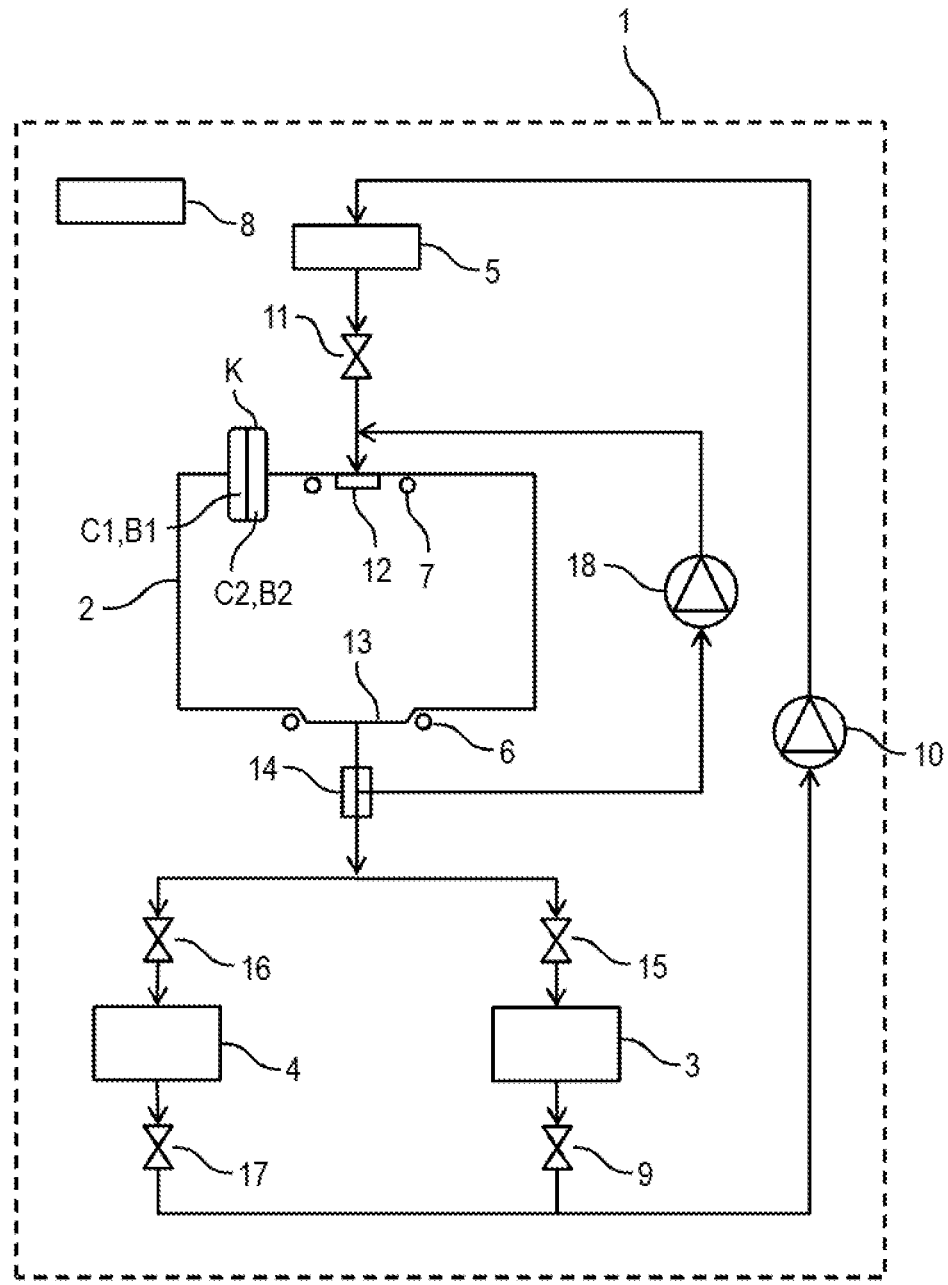
FIG. 1 shows an inventive cooking appliance.

FIG. 1 shows a domestic cooking appliance 1 with a cooking chamber 2, a first tank 3 that can be removed by a user, a second tank 4 that can be removed by a user and a buffer store 5.

The cooking chamber 2 can be heated by means of electrically operated heaters 6 and 7, which can be activated and/or deactivated by means of a control facility 8. The heater 6 here corresponds to a bottom heating unit, the heater 7 corresponds to a top heating unit. A circulating air heater may also be present but is not shown.

A dosing apparatus in the form of a single-use cleaning cartridge K, which has two chambers C1 and C2, can be inserted into the top of the cooking chamber. In an unused state the first chamber C1 is filled with an alkaline cleaning additive B1, while the second chamber C2 is filled with an acidic cleaning additive B2. Dosing openings (not shown) of the chambers C1 and C2 are separated from the cooking chamber 2 by means of respective closing elements, which can melt as a function of temperature, as they are made of wax for example. The closing elements are therefore exposed to the cooking chamber 2. A melting temperature of the closing element of the first chamber C1 here is lower than the melting temperature of the closing element of the second chamber C2. When the dosing openings are open, the additives B1 and B2 respectively are dispensed directly into the cooking chamber 2.

The first tank 3 is connected to a suction side of a pump 10 by way of a stop valve 9. A pressure side of the pump 10 is connected to the buffer store 5, so that the pump 10 can pump liquid, in particular water, out of the first tank 3 into the buffer store 5.

The buffer store 5 is connected to the cooking chamber 2 by way of a stop valve 11, so that when the stop valve 11 is open, liquid stored in the buffer store 5 can flow into the cooking chamber 2. In this process liquid can be introduced into the cooking chamber 2 by way of a nozzle 12 or the like arranged for example in the top of the cooking chamber 2.

A tray-type depression ("evaporator tray") is formed for example in the center of the base of the cooking chamber 2 and can be heated by the heater 6. Liquid present in the evaporator tray 13 can be evaporated by activating the heater 6. Liquid can be drained from the evaporator tray 13 by way of a 3/2-way valve 14 either (for example in a first switching position) into the first tank 3 or into the second tank 4 or (for example in a second switching position) to a further pump 18. The pressure side of the further pump 18 is connected to the nozzle 12, so that it can suck liquid, in particular water, out of the base of the cooking chamber 2 and pump it back into the top of the cooking chamber 2 under pressure. In this process the nozzle 12 can spray the liquid onto large surfaces of the walls of the cooking chamber 2. The domestic cooking appliance 1 therefore has a circulating circuit, which includes the cooking chamber 2 and the further pump 18 but neither of the two tanks 3 and 4.

In order to be able to conduct liquid flowing from the cooking chamber 2 specifically into the first tank 3 or the second tank 4 with the 3/2-way valve 14 in its first position, a stop valve 15 or 16 can be present between the 3/2-way valve 14 and the tanks 3 and 4 respectively. When the stop valve 15 or 16 is open, the respective tank 3 or 4 can be filled with liquid from the cooking chamber 2.

In order to be able to prevent liquid flowing out of the cooking chamber 2 particularly reliably, in one development a further stop valve (not shown) is present between the cooking chamber 2 and the 3/2-way valve 14. In a further development the further stop valve is connected immediately downstream of the 3/2-way valve 14. In yet another development that is advantageous for the same purpose the 3/2-way valve 14 can be switched to block or has a stop position. It can then be referred to as a 3/3-way valve. In these developments in particular a single 3/2-way valve (not shown) can be provided instead of the two stop valves 15 and 16.

The second tank 4 is connected by way of a stop valve 17 to the suction side of the pump 10, so that liquid, in particular water, can be pumped out of the second tank 4 into the buffer store 5 by means of the pump 10.

Figure 2:
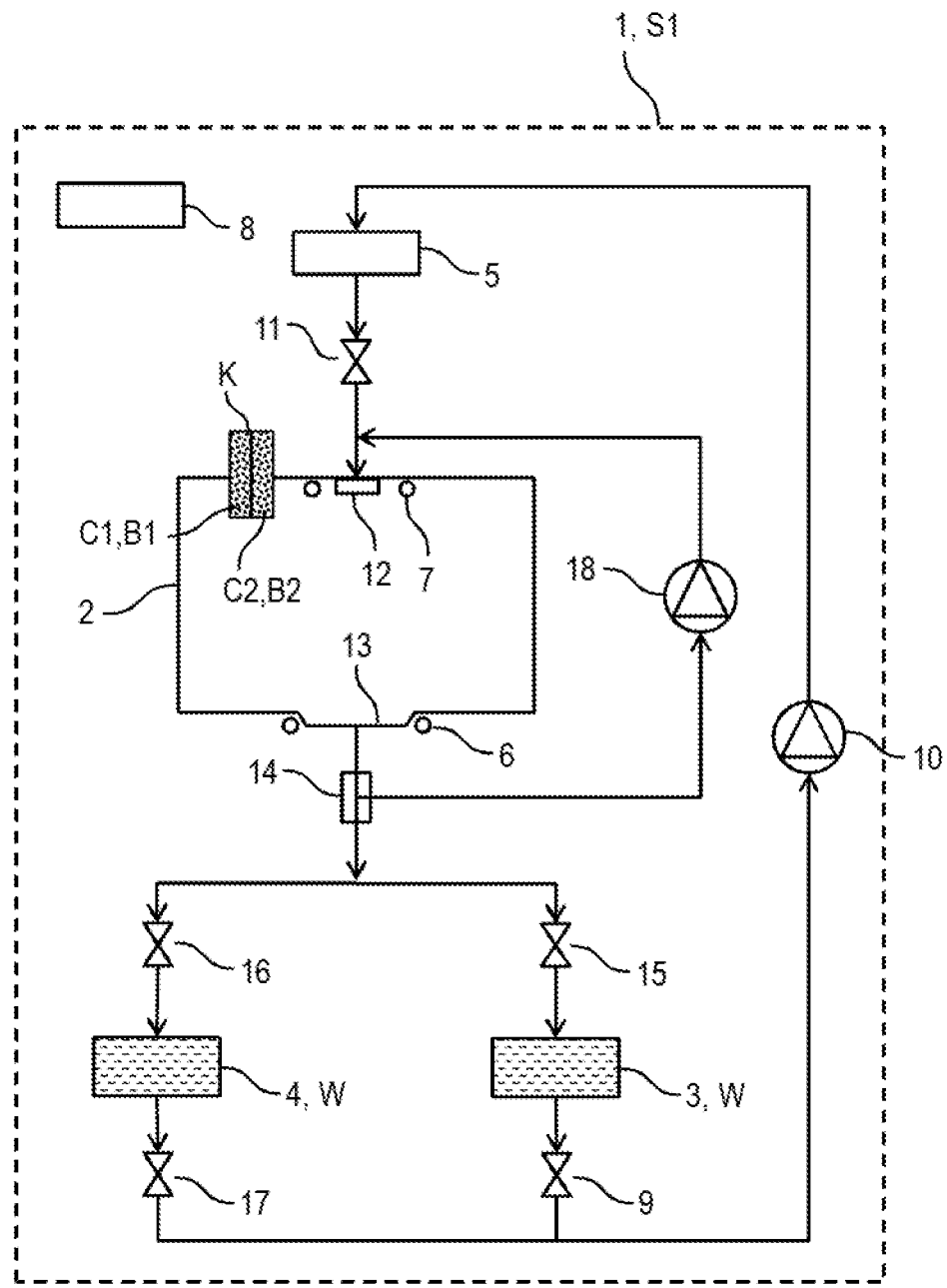
FIGS. 2 to 14 show the cooking appliance at different method steps of a cleaning procedure.

The domestic cooking appliance 1 can be operated in particular as follows:

A user inserts a full cartridge K into the cooking chamber 2. In a first step corresponding to steps a and j of the method the user has also filled the first tank 3 and the second tank 4 with clear water W, as shown in FIG. 2. The buffer store 5 in contrast is empty. The user now activates a cleaning program so that the domestic cooking appliance 1 carries out the further steps fully automatically. Said user can however also have activated the cleaning program before step a, j for example.

Figure 3:
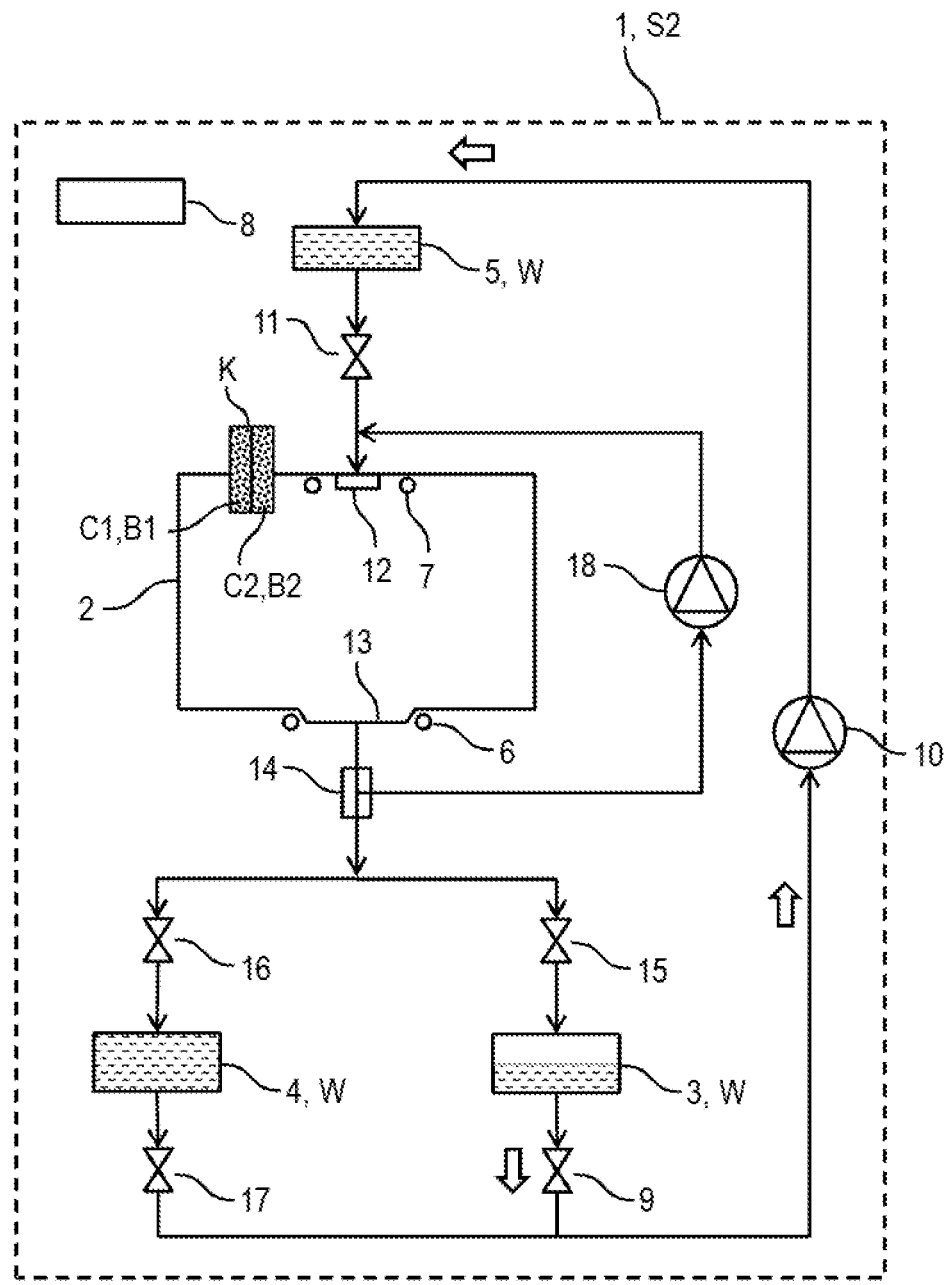

In a second step b shown in FIG. 3 the control facility 8 now opens the stop valve 9 and activates the pump 10 so that roughly half the clear water W present in the first tank 3 is moved into the buffer store 5 (a flow of the water W being shown by the open arrows).

Figure 4:
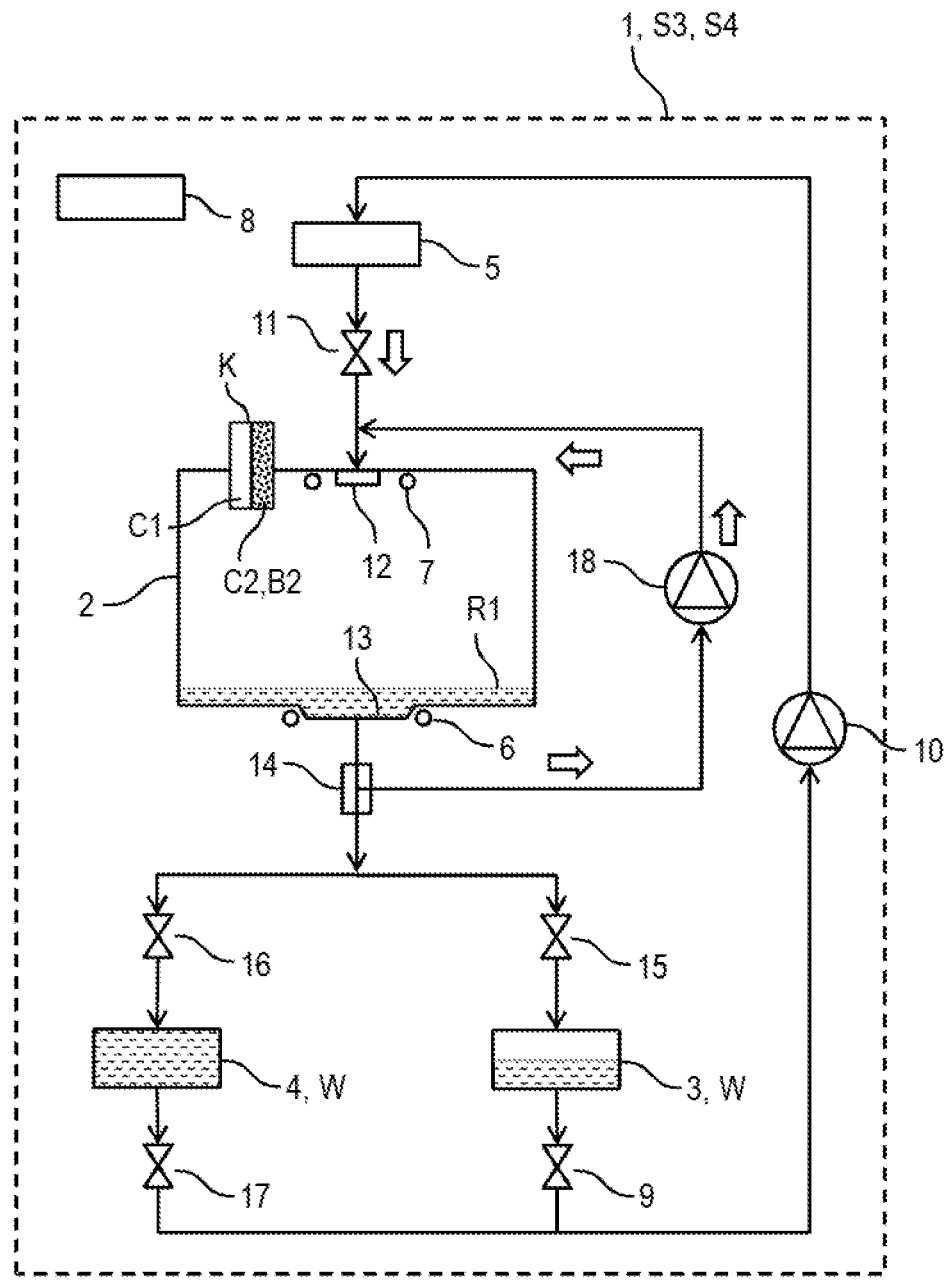

In the third step c shown in FIG. 4 the water W present in the buffer store 5 is drained into the cooking chamber 2 by opening the stop valve 11. The cooking chamber 2 is also heated to a cooking chamber temperature at which the closing element of the chamber C1 melts, while the closing element of the chamber C2 does not. This opens the dosing opening of the chamber C1, whereupon the alkaline cleaning additive B1 passes into the cooking chamber 2, where it mixes with the water W released from the buffer store 5 to form a first, alkaline cleaning agent R1, in particular dissolving in the water W for this purpose. This produces the first cleaning agent R1 in the cooking chamber 2. As an alkaline solution the cleaning agent R1 can have a pH value of over 11 for example.

In a following fourth step d, also shown in FIG. 4, the first cleaning agent R1 is left in the cooking chamber 2 for a first time period, in order to dissolve grease in particular by means of its alkaline effect.

In order to improve a cleaning effect, the liquid first cleaning agent R1 present in the evaporator tray 13 is evaporated, e.g. by activating the heater 6 accordingly. This allows the entire surface of the cooking chamber 2 to be made wet.

Generally a cleaning effect is improved if the first cleaning agent R1 is heated, even if it is not evaporated. To this end at least one cooking chamber heater, for example one of the heaters 5 and/or 6, and/or a circulating air heater, can be activated.

In order to improve the cleaning effect further, liquid cleaning agent R1 is additionally or alternatively circulated, e.g. by activating the further pump 18 accordingly. This allows large surfaces of the cooking chamber 2 to be sprayed by way of the nozzle 12. To this end the 3/2-way valve 14 is in its second switching position.

Figure 5:
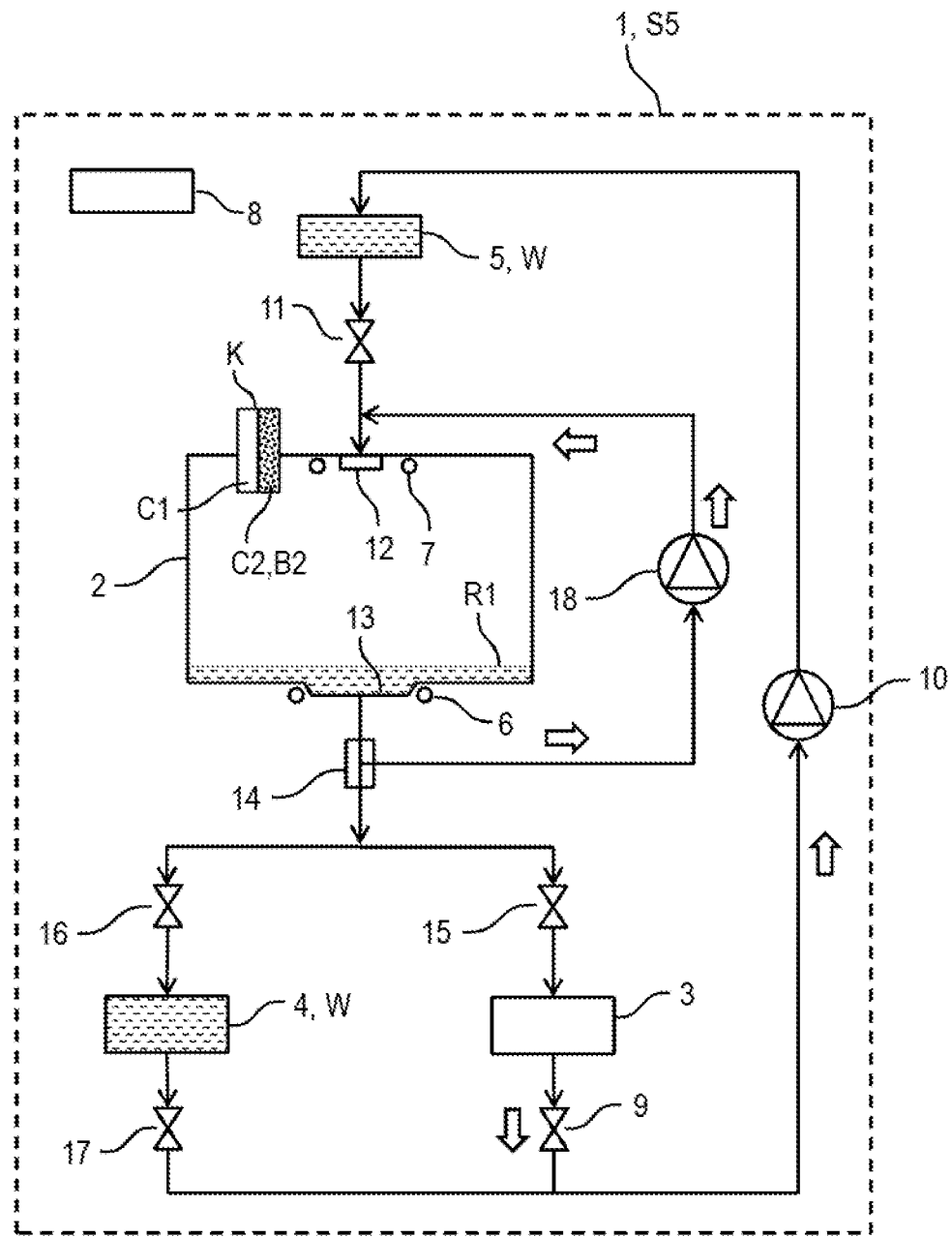

In a further step e shown in FIG. 5 the remaining clear water W of the first tank 3 is pumped into the buffer store 5, while the first cleaning agent R1 is still in the cooking chamber 2.

Figure 6:
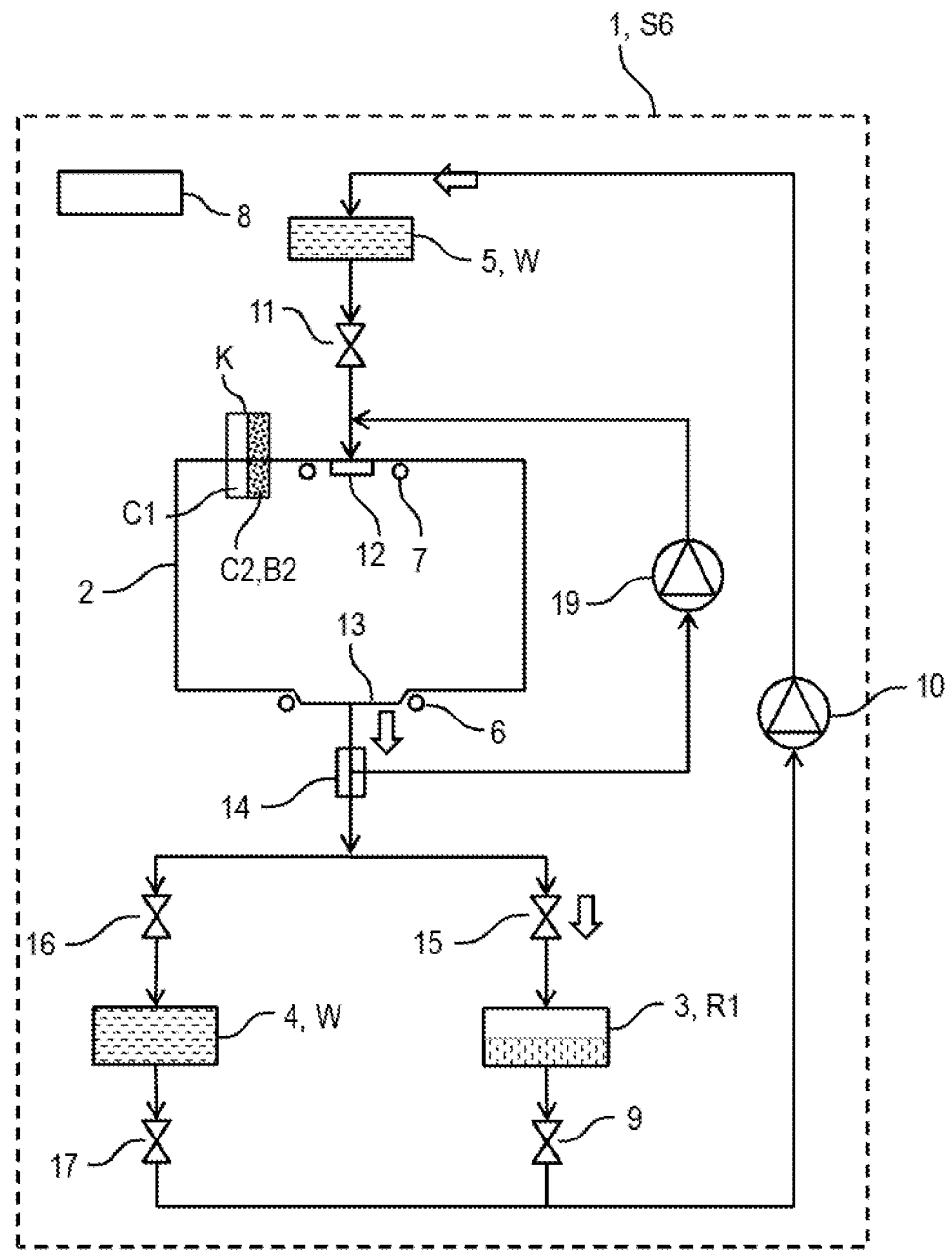

Then in a step f, as shown in FIG. 6, the cleaning agent R1 is drained out of the cooking chamber 2 into the first tank 3, where appropriate with the heater 6 switched off and the further pump 18 still running. To this end the 3/2-way valve 14 is now in its first switching position, the stop valve 15 is open and the stop valve 16 is closed. The discharge from the cooking chamber is then blocked again.

Figure 7:
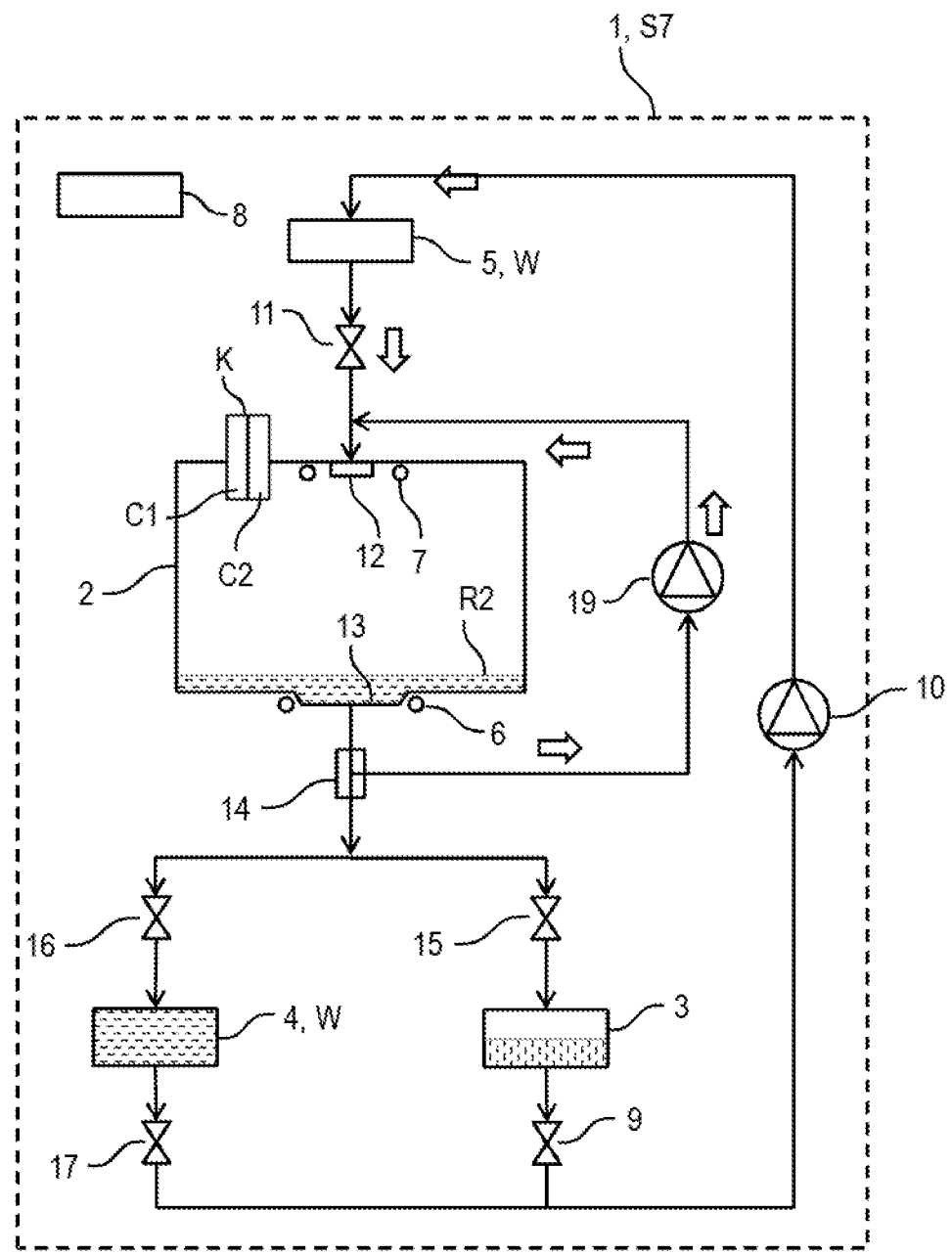

FIG. 7 shows a following step g, in which the stop valve 11 is opened to allow the water W present in the buffer store 5 to be drained into the cooking chamber 2. The cooking chamber temperature is now increased to such a degree that the closing element of the chamber C2 melts. This causes the dosing opening of the chamber C2 to open, whereupon the acidic cleaning agent B2 passes into the cooking chamber 2, where it mixes with the water W released from the buffer store 5 to form a second, acidic cleaning agent R2, in particular dissolving in the water W for this purpose. This produces the second cleaning agent R2 in the cooking chamber 2. As an acidic solution the cleaning agent R2 can have a pH value of below 2 for example.

In a step h, which is also shown in FIG. 7, as in step d the second cleaning agent R2 can be left in the cooking chamber 2 for a second time period, advantageously being circulated and heated.

Figure 8:
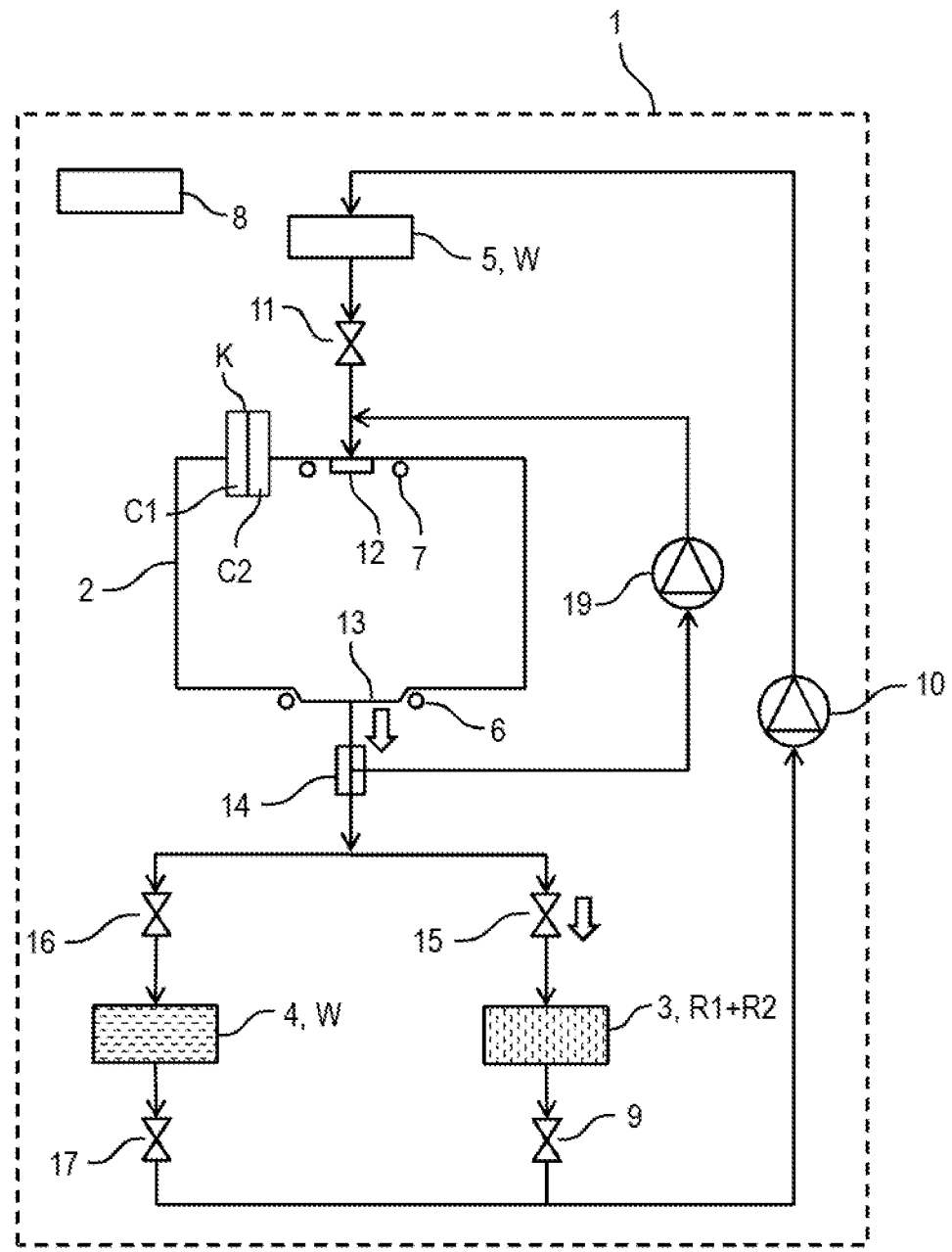

FIG. 8 shows a step i, in which the second cleaning agent R2 has now been drained into the first tank 3. The first cleaning agent R1 and the second cleaning agent R2 largely neutralize one another in the first tank 3, for example forming a totally neutral, a slightly acidic or a slightly neutral liquid that a user can handle without risk.

Figure 9:
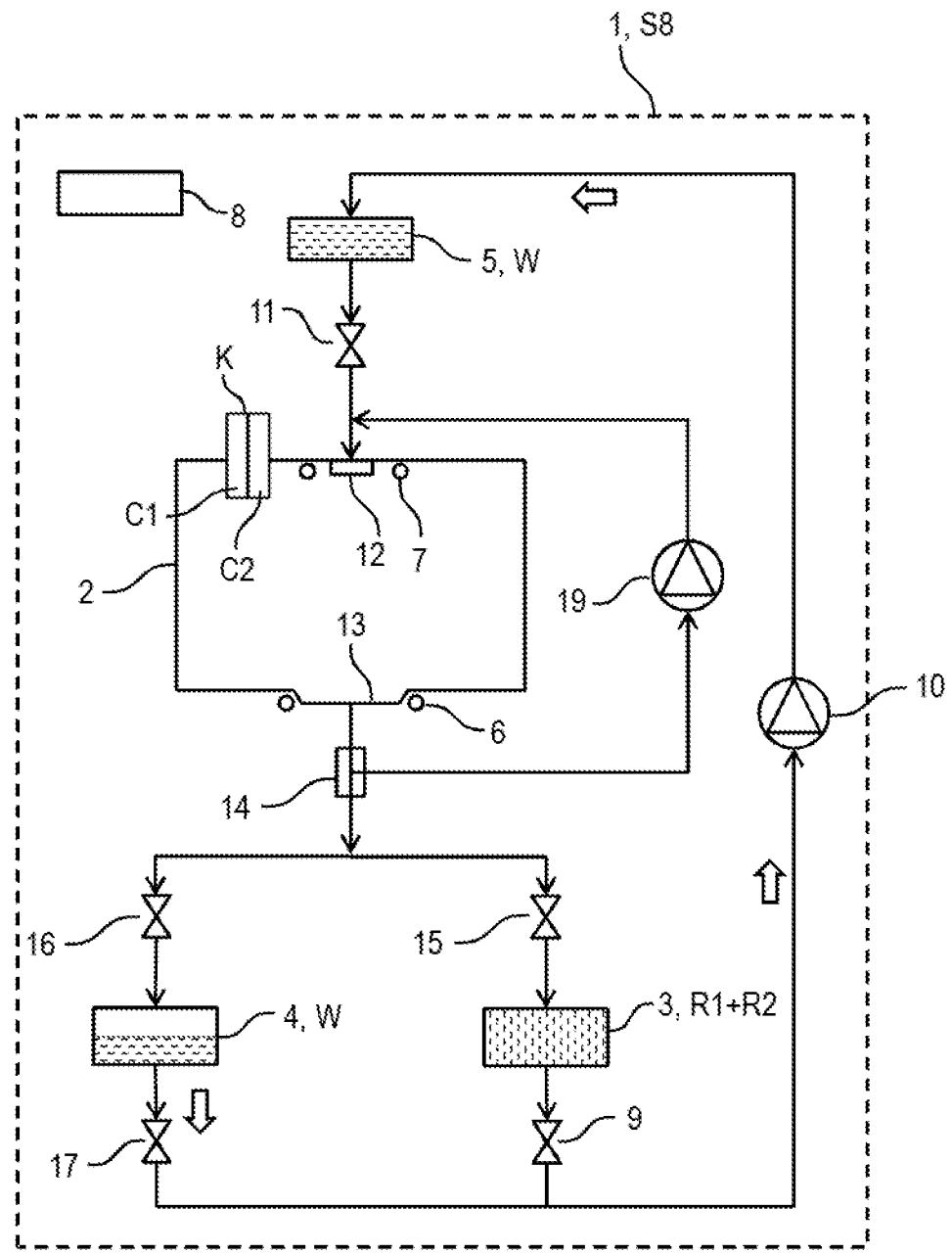

FIG. 9 shows a step k—like step b—in which by opening the stop valve 17 and activating the pump 10 approx. half the water W present in the second tank 4 is moved into the buffer store 5.

Figure 10:
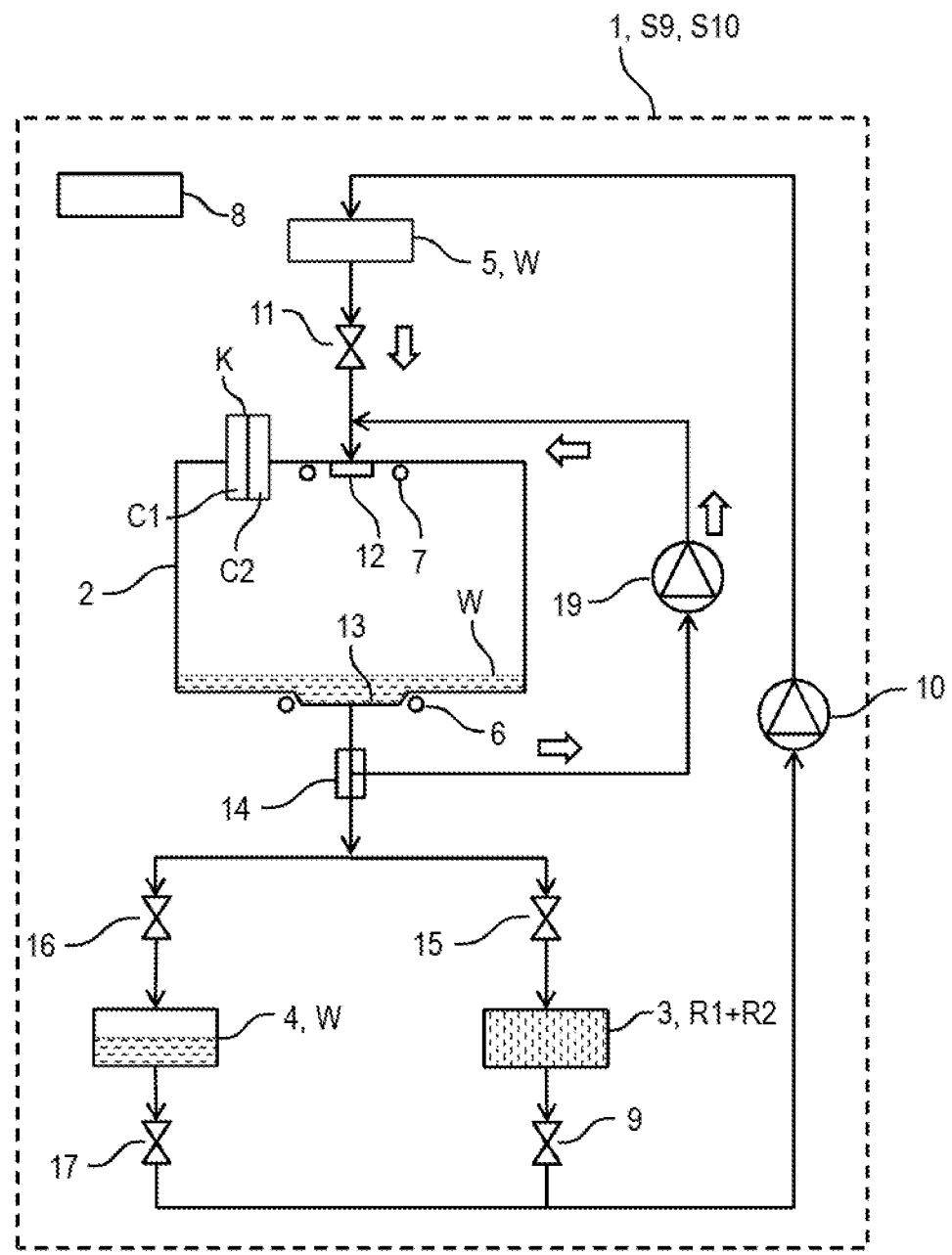

FIG. 10 shows a state of the domestic cooking appliance 1, in which in a step l like step c the water W has been drained out of the buffer store 5. As the cartridge K is already empty, the water W per se is used as a treatment agent, specifically for rinsing, in order to remove residues of the cleaning agents R1 and/or R2 from the cooking chamber 2.

In a step m the water W is also left in the cooking chamber 2 for a third treatment period, advantageously being circulated and/or heated.

Figure 11:
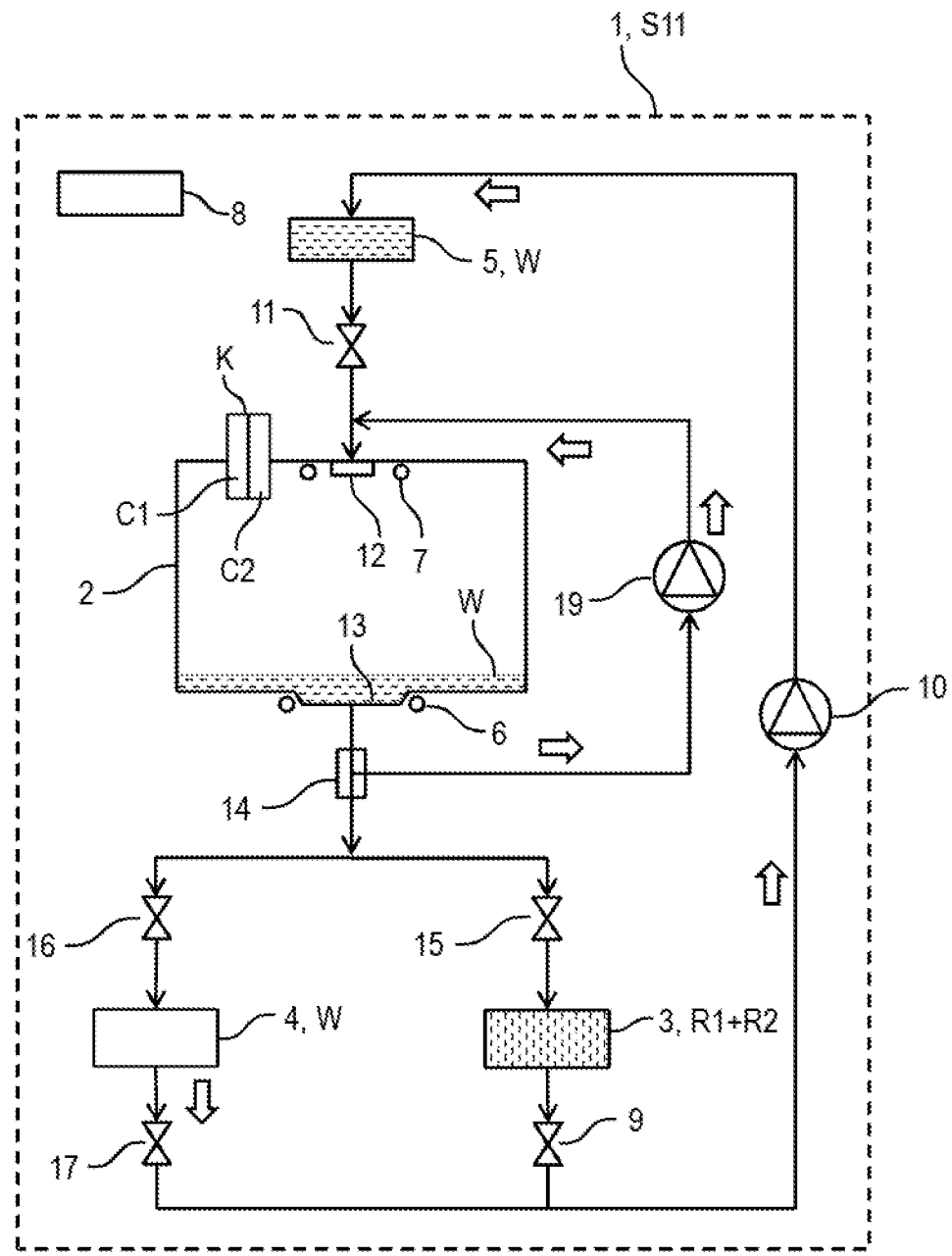

FIG. 11 shows a step n, in which—like step e—the remaining clear water W of the second tank 4 has been pumped into the buffer store 5, while the water W used for rinsing is still in the cooking chamber 2.

Figure 12:
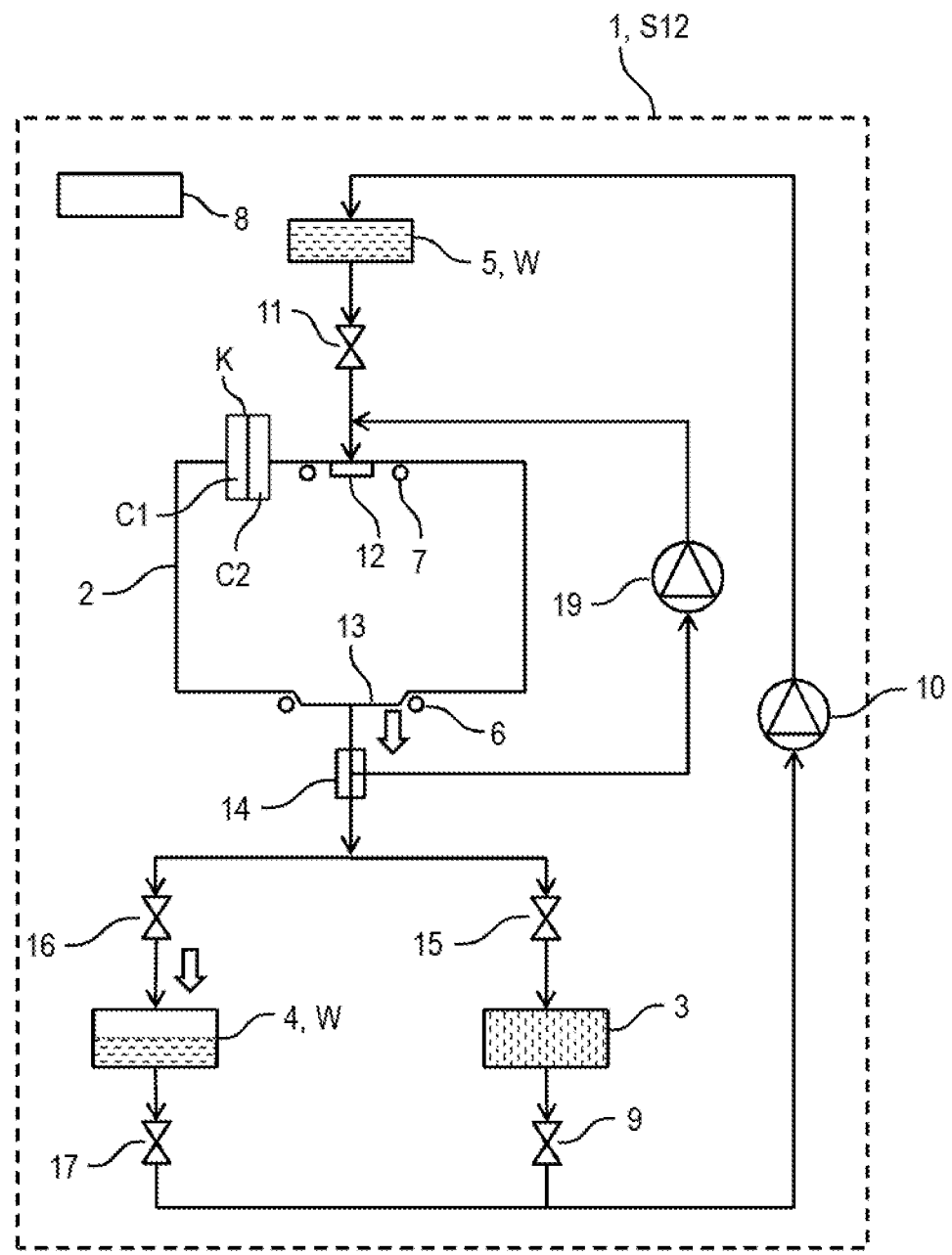

FIG. 12 shows a step o, in which—like step f—the water W now mixed with residues of the cleaning agent R1 and/or R2 is drained into the second tank 4, where appropriate with the heater 6 switched off and the further pump 18 still running.

Figure 13:
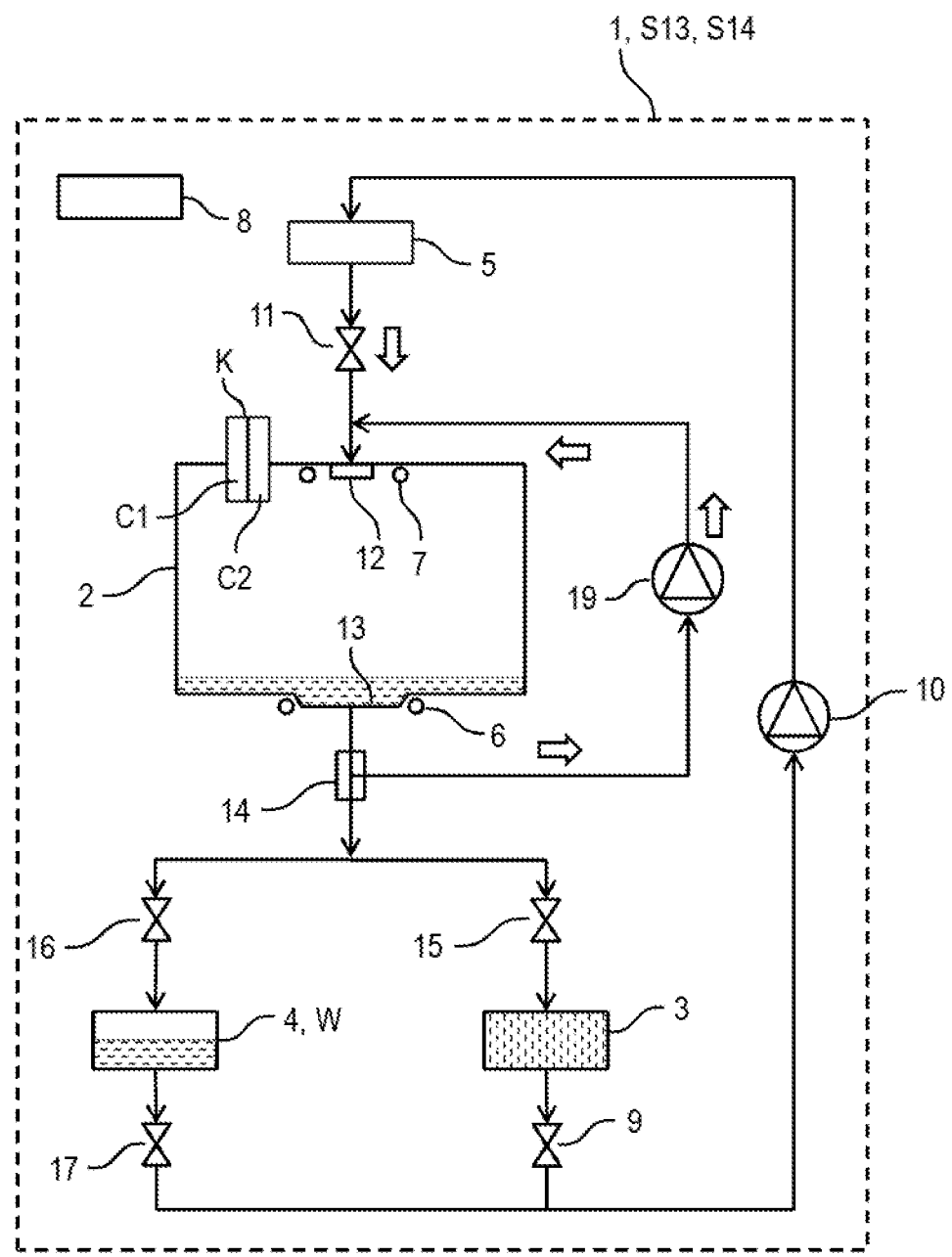

FIG. 13 shows a step p, in which—like step g—the water W present in the buffer store 5 is drained into the cooking chamber 5 by opening the stop valve 11. The water W serves as a fourth treatment agent, for example for a final rinse.

Then in a step q—like step h for example—the water W is left in the cooking chamber 2 for a second time period, advantageously being circulated and heated.

Figure 14:
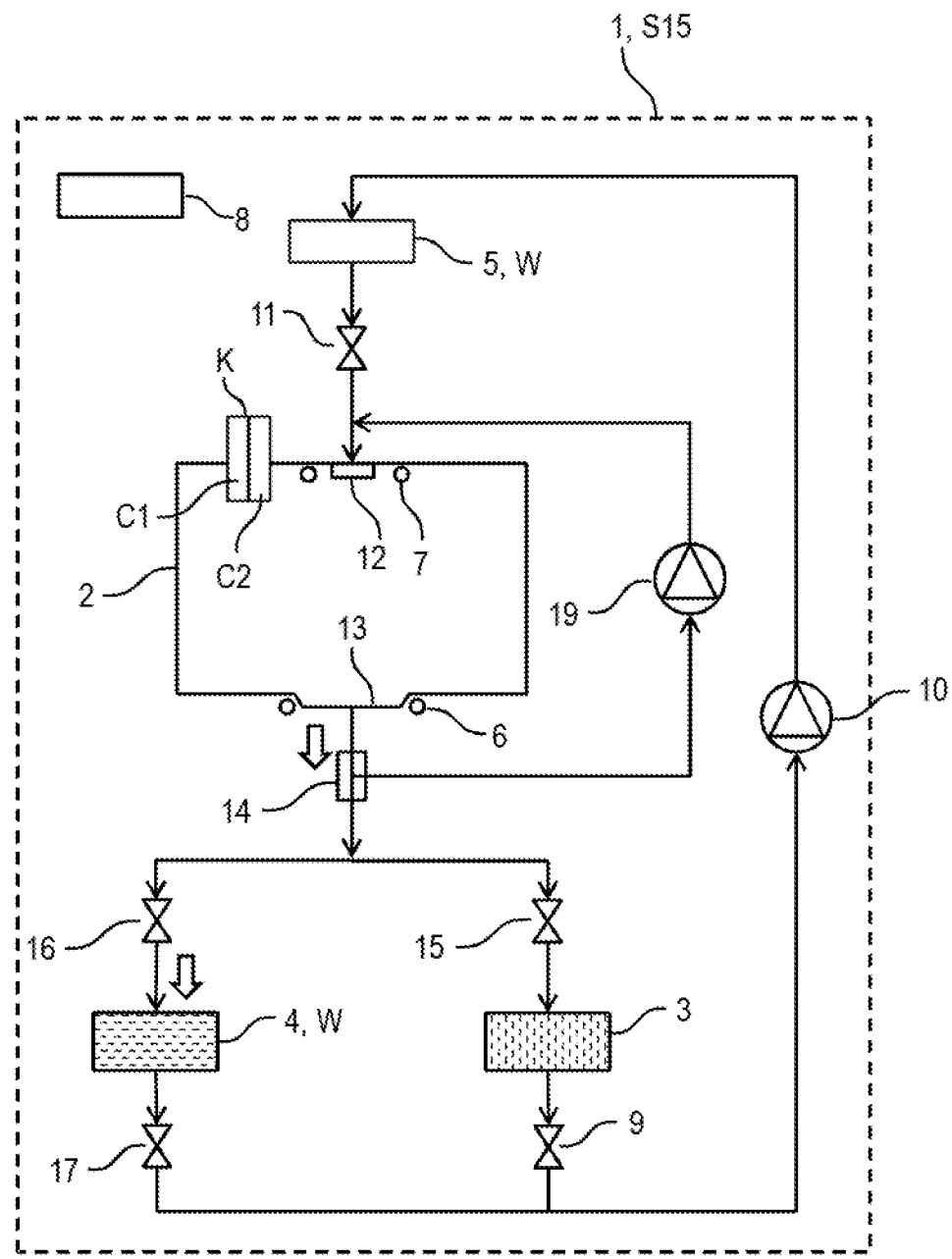

FIG. 14 shows a step r, in which the water W is drained out of the cooking chamber 2 into the second tank 4. Both tanks 3 and 4 are therefore now filled again and can be removed for emptying by a user.

Generally the domestic cooking appliance 1 can lock the tanks 3 and 4 to prevent removal, for example during the cleaning procedure, if a temperature of the content of the tanks 3 and/or 4 is still too high, etc.

The present invention is of course not limited to the exemplary embodiment shown.

Generally "one", etc. can refer to a single item or a number, in particular in the sense of "at least one" or "one or more", etc., unless this is specifically excluded, for example by the expression "just one", etc.

Also a number can refer to just the stated number as well as a standard tolerance range, unless this is specifically excluded.

The invention claimed is:

1. A method for carrying out a cleaning procedure for a cooking appliance, said method comprising:

filling a first tank of the cooking appliance by a user with water, moving a first portion of water in the first tank into a buffer store of the cooking appliance, opening a valve between the buffer store and a cooking chamber of the cooking appliance, moving the first portion of water in the buffer store through the valve into the cooking chamber of the cooking appliance to provide a first treatment agent in the cooking chamber, closing the valve, leaving the first treatment agent in the cooking chamber for a first time period, moving a second portion of water in the first tank into the buffer store, moving the first treatment agent into the first tank, opening the valve, moving the second portion of water in the buffer store through the valve into the cooking chamber to provide a second treatment agent in the cooking chamber, closing the valve, leaving the second treatment agent in the cooking chamber for a second time period, and moving the second treatment agent into the first tank.

2. The method of claim 1, wherein the first treatment agent and the second treatment agent neutralize one another.

3. The method of claim 1, wherein the second treatment agent is clear water.

4. The method of claim 1, wherein the first treatment agent is clear water.

5. The method of claim 1, further comprising:

filling a second tank of the cooking appliance by the user with water, moving a first portion of water in the second tank into the buffer store of the cooking appliance, opening the valve between the buffer store and the cooking chamber of the cooking appliance, moving the first portion of water in the buffer store through the valve into the cooking chamber to provide a third treatment agent, closing the valve, leaving the third treatment agent in the cooking chamber for a third time period, moving a second portion of water in the second tank into the buffer store, moving the third treatment agent into the second tank, opening the valve, moving the second portion of water in the buffer store through the valve into the cooking chamber to provide a fourth treatment agent, closing the valve, leaving the fourth treatment agent in the cooking chamber for a fourth time period, and moving the fourth treatment agent into the second tank.

6. The method of claim 5, wherein the fourth treatment agent is clear water.

7. The method of claim 5, wherein the third treatment agent is clear water.

8. The method of claim 5, further comprising heating at least one of the first, second, third and fourth treatment agents in the cooking chamber.

9. The method of claim 5, further comprising applying steam of at least one of the first, second, third and fourth treatment agents to the cooking chamber.

10. The method of claim 5, further comprising circulating at least one of the first, second, third and fourth treatment agents.

* * * * *